Nov. 13, 1951     A. H. BRADFORD     2,574,812
ORCHARD SPRAY HEAD
Filed March 4, 1950
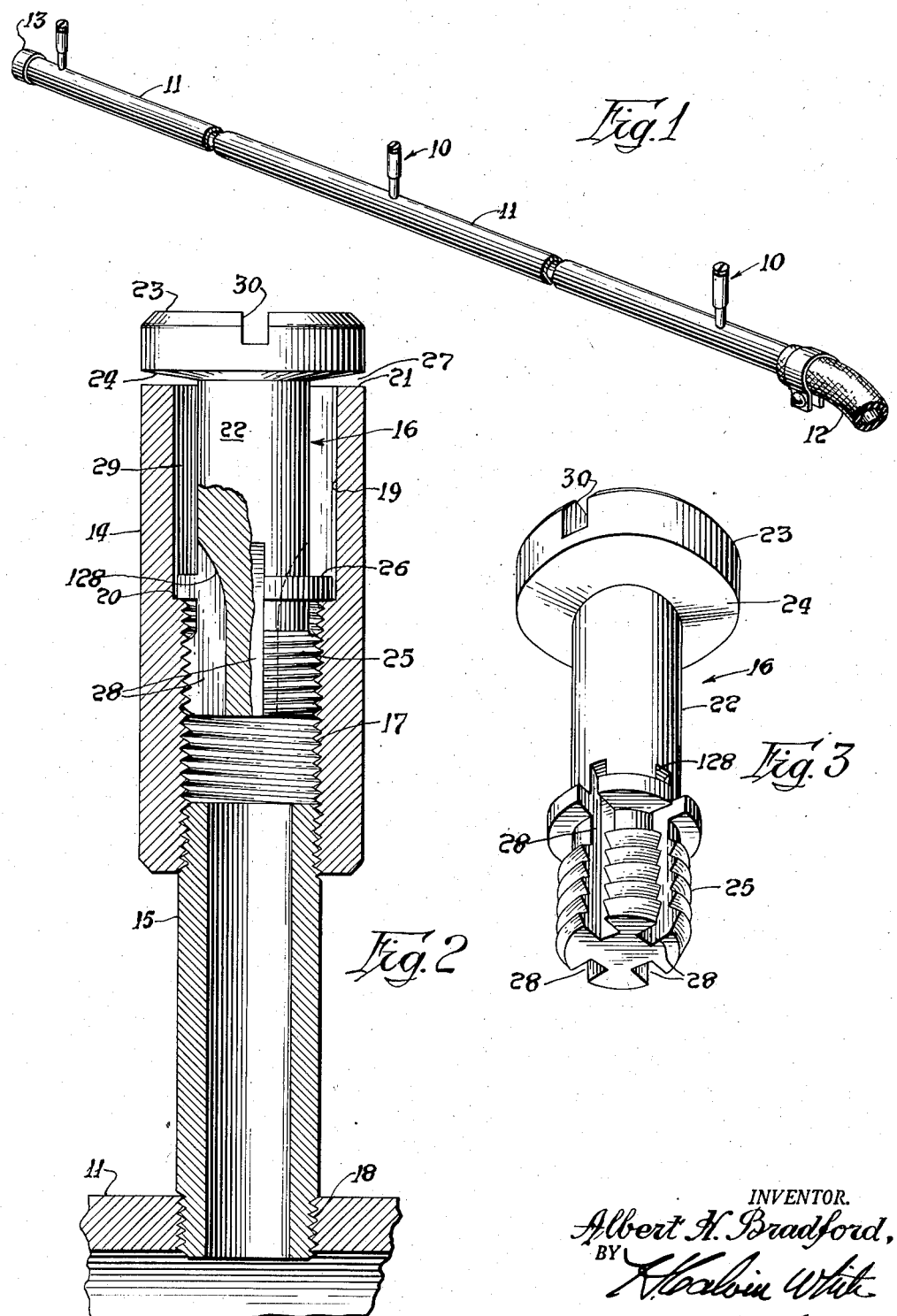
INVENTOR.
Albert H. Bradford,
BY
Attorney.

Patented Nov. 13, 1951

2,574,812

UNITED STATES PATENT OFFICE 2,574,812

ORCHARD SPRAY HEAD

Albert H. Bradford, Placentia, Calif.

Application March 4, 1950, Serial No. 147,665

5 Claims. (Cl. 299—106)

This invention relates generally to improved spray heads adapted for various agricultural and other uses, and particularly intended for watering orchards in arid and semi-arid regions.

Any agricultural sprinkling system must of course employ a relatively large number of individual spray heads, each covering a small area and relatively positioned to collectively spray an entire orchard or field. While it is necessary that these individual sprayers be well constructed to effectively water their respective areas, it is also essential that their cost be kept to an absolute minimum to avoid excessive expense in the sprinkling operation. With this fact in mind, an important object of the present invention is to provide a spray head having all of the structural and functional features necessary for effective operation and yet characterized by extreme simplicity and consequent low cost.

In order to produce a finely divided mist-like spray pattern, a sprinkler should contain one or more highly restricted spray forming passages through which the water is forced to travel and by which the pattern is formed. However, such restricted passages introduce a troublesome problem into the operation of a spray system by reason of their inherent tendency to clog, especially in agricultural spraying where the volume of water handled and the number of sprayers used renders impractical the filtering of all of the water before its delivery to the sprayers. Consequently, a particular object of the present invention is to provide a sprayer which, though having in its normal condition a relatively restricted spray discharge passage adapted to form an effective spray pattern, is specially constructed in a manner permitting rapid and easy cleaning of that restricted passage when necessary. To attain this result, I preferably form the spray device as a pair of separable sections, one being a tubular fluid passing body section and the other a headed spray directing plug normally threaded into the body but easily removable for cleaning. In the active position of the plug, its head may form with the body of the sprayer a restricted annular discharge passage or gap acting to produce an effective circular spray pattern. However, when the plug is removed, the inner surfaces of both the body and plug are freely accessible for cleaning, and the body, in particular, is entirely open for free and unrestricted passage of water in a manner washing away any clogging particles which may have accumulated.

A further object of the invention is to provide means for accurately locating the plug in its normal active position in a manner assuring that the restricted fluid discharge gap formed by the body and plug will be of a predetermined dimension. Since the dimension of this gap determines the water distribution pattern, I assure by controlling the gap size that an optimum spray pattern will be produced at all times. For this purpose, the plug and spray body may have engaging shoulders limiting their threaded interconnection at the desired relative condition.

Preferably, the spray forming plug has a mounting stem extending into the fluid passing body and removably connected directly to its tubular wall. As will appear, an important aspect of the invention involves the unique formation of the plug and body in a manner permitting water flow past their point of connection within the body and toward the spray discharge gap. Preferably, such passage of the water is permitted by formation in the plug stem of one or more recesses or grooves extending axially through its mounting threads. As will appear, it is an additional object of the invention to form the plug and body in a manner providing a mixing chamber beyond these connection passing recesses in the plug to assure adequate mixing of the water from the various recesses before discharge through the annular spray discharge gap, so that the water will be evenly distributed along the entire circular extent of the spray pattern.

Further features of the invention involve the formation of the spray directing body and plug surfaces in a manner producing a most effective spray pattern. In this connection, I have attained most desirable results by slightly tapering the annular water passing surface of the plug head, preferably at an angle of less than about four degrees.

It is contemplated that in most sprinkling systems several spray heads will be connected at spaced intervals into a common supply pipe. To equalize the discharge rates of the various sprayers under such conditions, I form in each a relatively restricted water inlet passage acting as a choke to overcome the effect of the normal pressure drop along such a supply pipe.

The above and further features and objects of the present invention will be better understood from the following detailed description of the typical embodiment illustrated in the accompanying drawing, in which:

Fig. 1 is a fragmentary perspective view of a spraying system employing a number of spray heads embodying the present invention;

Fig. 2 is an enlarged fragmentary vertical section through one of the individual sprayers; and Fig. 3 is a perspective view of the removable spray plug.

Referring first to Fig. 1, a number of sprayers 10 embodying the invention may be connected at spaced intervals into a single distributing pipe 11 receiving water at one of its ends from supply hose 12 and closed at its other end by cap 13. As seen best in Figs. 2 and 3, each of the sprayers comprises a tubular upper body 14, a lower relatively restricted inlet tube 15, and a removable spray forming plug 16 received in the upper end of the body. The lower end of inlet tube 15 is connected at 18 to a threaded opening in distributing pipe 11 to receive water from that pipe for passage upwardly into the spray body. The upper end of the inlet tube threadedly engages the lower portion of a threaded bore 17 in the body.

The upper portion of body 14 contains an inner cylindrical bore 19 of a diameter somewhat larger than the maximum diameter of threaded bore 17. Between this enlarged upper bore 19 and the threaded lower bore 17, the body forms a transverse upwardly facing annular shoulder 20 against which the plug bears in its active position. The upper open end of tubular body 14 forms a discharge opening through which the water to be sprayed passes. About this upper discharge opening, the body presents an annular transversely extending spray forming upper surface 21.

Spray plug 16 has a depending stem portion 22 received within the upper open end of the body and carrying a spray forming circular head 23 above the body of an external diameter substantially equal to the external diameter of the body. The annular undersurface 24 of head 23 is slightly tapered to form with upper surface 21 of the body a restricted annular outwardly expanding spray discharge gap 27 for controlling the discharged water to produce an effective spray pattern. The angle of taper of surface 24 is considered extremely important and should be not greater than about four degrees from the horizontal.

Stem 22 of the spray plug is enlarged and externally threaded at its lower end 25 and retains the plug to the body by threaded engagement of bore 17. Above its threaded lower end 25, stem 22 has an essentially annular transverse flange 26 engageable with shoulder 20 of the body to limit movement of the plug into the body and thus accurately determine the vertical dimension of the restricted spray discharge gap 27. To permit passage of water upwardly past the threaded connection between the body and plug and past flange 26, the outer surface of plug stem 22 contains four angularly spaced recesses or grooves 28 extending axially from the bottom of the stem to a location above the flange. The upper ends of these recesses may be curved smoothly outwardly at 128 to direct the water out of the recesses with a minimum of turbulence.

Above the flange, stem 22 of the plug is annularly spaced from bore 19 of the body through a considerable axial or vertical extent to form a relatively elongated annular mixing chamber 29 in which the four streams from recesses 28 in the stem have ample opportunity to mix before their arrival at the discharge opening. Such mixing of the streams assures even distribution of water along the entire annular extent of discharge gap 27 to produce a uniform circular spray. The upper surface of plug head 23 may have a transverse groove 30 adapted to receive a screw driver for removing the plug from the body.

In use, a number of sprayers 10 may be connected into each of a number of supply pipes 11 to collectively cover an entire orchard or field. As will be appreciated, the choke inlet tubes 15 of the various sprayers restrict the passage of water from pipe 11 into the sprayers to equalize the distribution of water to the various sprayers regardless of their position along the supply line.

Plug 16 is normally in the position of Fig. 2 within body 14. In this condition, water may then flow upwardly through inlet 15, recesses 28 in the plug, and mixing chamber 29 to discharge outwardly through annular gap 27 in the form of an even and finely distributed circular spray. If any of the internal passages within the sprayer should become clogged, it is a simple matter to remove the plug by hand or by screw driver inserted in its upper slot 30, after which water may pass freely through the body to cleanse it of any particles that may have accumulated. Also, such removal renders the external surfaces of plug 16 freely accessible for cleaning, after which the plug may be easily screwed back into position for further use.

I claim:

1. A sprayer including a body section having a tubular fluid passing portion with an open discharge end, a spray directing plug section having a head portion disposed across and spaced from said discharge end of the body to form therewith a spray discharge gap and having a reduced dimension stem portion extending into said discharge end of the body and removably connected to the body at an inner location, and a pair of shoulders on the body and plug stem at a location spaced from said head of the plug and engageable to limit movement of the plug into the body upon connection thereto to thereby maintain a predetermined discharge gap dimension, one of said sections containing recess means directly adjacent and facing the other section and extending through the connection to the other section and through a corresponding one of said shoulders to conduct fluid past the connection and shoulders.

2. A sprayer including a body section having a tubular fluid passing portion with an open discharge end, a spray directing plug section having a head portion disposed across and spaced from said discharge end of the body to form therewith an annular spray discharge gap and having a reduced dimension stem portion extending into said discharge end of the body and threadedly connected to the body at a location spaced inwardly from its discharge end, said body having an inner essentially annular transversely extending shoulder between the plug mounting threads and the discharge end of the body, and an essentially annular flange on the plug stem at a location spaced from the head of the plug and engageable with said shoulder to limit movement of the plug into the body and thereby maintain a predetermined discharge gap dimension, said plug stem having a recess in its outer surface extending through the threads of said plug mounting connection and through said flange to conduct fluid therepast.

3. A sprayer including a body section having a tubular fluid passing portion with an open discharge end, a spray directing plug section having a head portion disposed across and spaced from said discharge end of the body to form therewith a spray discharge gap and having a reduced dimension stem portion extending into said discharge end of the body and threadedly connected to the body at an inner location, a pair of shoulders on the body and plug engageable to limit movement of the plug into the body upon connection thereto to maintain a predetermined discharge gap dimension, and passage means formed in the stem for conducting fluid past the plug mounting connection and said shoulders.

4. A sprayer including a body section having a tubular fluid passing portion with an open discharge end, and a spray directing plug section having a head portion disposed across and spaced from said discharge end of the body to form therewith a spray discharge gap and having a reduced dimension stem portion extending into said discharge end of the body and removably connected to the body at an inner location, said body and said plug stem having engaging shoulders at a location spaced from the head of the plug and acting to limit movement of the plug into the body to thereby maintain a predetermined discharge gap dimension, and one of said sections containing a recess directly adjacent and facing the other section and extending through a corresponding one of said shoulders to conduct fluid therepast.

5. A sprayer including a body section having a tubular fluid passing portion with an open discharge end, and a spray directing plug section having a head portion disposed across and spaced from said discharge end of the body to form therewith a spray discharge gap and having a reduced dimension stem portion extending into said discharge end of the body and threadedly connected to the body at an inner location, said body and plug stem having engaging shoulders at a location spaced from the head of the plug and acting to limit movement of the plug into the body to thereby maintain a predetermined discharge gap dimension, and one of said sections containing a recess directly adjacent and facing the other section and extending through the threads of said plug mounting connection and through one of said shoulders to conduct fluid therepast.

ALBERT H. BRADFORD.

REFERENCES CITED

The following references are of record in the file of this patent:

UNITED STATES PATENTS

| Number | Name | Date |
|---|---|---|
| 1,726,490 | Irving | Aug. 27, 1929 |
| 2,083,282 | Thompson | June 8, 1937 |
| 2,128,552 | Rader | Aug. 30, 1938 |